United States Patent
Galoul et al.

(10) Patent No.: US 11,624,286 B2
(45) Date of Patent: Apr. 11, 2023

(54) INSERT FOR RE-USING IMPINGEMENT AIR IN AN AIRFOIL, AIRFOIL COMPRISING AN IMPINGEMENT INSERT, TURBOMACHINE COMPONENT AND A GAS TURBINE HAVING THE SAME

(71) Applicant: DOOSAN ENERBILITY CO., LTD., Changwon-si (KR)

(72) Inventors: Vincent Galoul, Baden (CH); Simon Hauswirth, Baden (CH); Richard Jones, Aden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/149,511

(22) Filed: Jan. 14, 2021

(65) Prior Publication Data
US 2021/0246796 A1    Aug. 12, 2021

(30) Foreign Application Priority Data
Feb. 12, 2020    (DE) .................... 10 2020 103 648.5

(51) Int. Cl.
*F01D 5/18*    (2006.01)
(52) U.S. Cl.
CPC .......... *F01D 5/188* (2013.01); *F05D 2220/32* (2013.01); *F05D 2260/201* (2013.01)
(58) Field of Classification Search
CPC .......... F01D 5/186; F01D 5/187; F01D 5/188; F01D 5/189; F05D 2260/201
See application file for complete search history.

(56) References Cited

U.S. PATENT DOCUMENTS

| 5,120,192 A | 6/1992 | Ohtomo et al. |
| 2010/0221123 A1* | 9/2010 | Pal .......................... F01D 5/189 |
| | | 416/97 R |

(Continued)

FOREIGN PATENT DOCUMENTS

| DE | 4430302 A1 | 2/1996 |
| GB | 849255 A | 9/1960 |

(Continued)

OTHER PUBLICATIONS

Office Action issued by German Patent Office dated Nov. 16, 2020.
KR Office Action, dated Jul. 5, 2022.

*Primary Examiner* — Richard A Edgar
*Assistant Examiner* — Michael K. Reitz
(74) *Attorney, Agent, or Firm* — Harvest IP Law LLP

(57) ABSTRACT

Impingement insert for an airfoil of a blade/vane of a gas turbine is provided. The impingement insert includes a double-walled section having an outer and an inner walls, that define—an inner channel at an inner surface of the inner wall, an outer channel at an outer surface of the outer wall and a middle channel between the outer and the inner walls. Impingement cooling holes are provided in the outer wall that use the cooling air of the middle channel to eject impingement jets into the outer channel. The impingement insert includes at least one extraction duct that extends between the outer and the inner walls across the middle channel, and has an inlet at the outer channel, and an outlet at the inner channel, for flowing the cooling air, after impingement, from the outer channel into the inner channel.

20 Claims, 10 Drawing Sheets

(56) References Cited

U.S. PATENT DOCUMENTS

| | | | | |
|---|---|---|---|---|
| 2013/0052008 A1* | 2/2013 | Spangler | ................ | F01D 5/189 |
| | | | | 416/1 |
| 2015/0267557 A1* | 9/2015 | Facchinetti | ............ | F01D 5/147 |
| | | | | 416/95 |
| 2017/0022818 A1* | 1/2017 | Weinert | ................ | F01D 11/001 |

FOREIGN PATENT DOCUMENTS

| JP | S5672201 A | 6/1981 |
|---|---|---|
| JP | 2012202342 A | 10/2012 |

\* cited by examiner

INSERT FOR RE-USING IMPINGEMENT AIR IN AN AIRFOIL, AIRFOIL COMPRISING AN IMPINGEMENT INSERT, TURBOMACHINE COMPONENT AND A GAS TURBINE HAVING THE SAME

CROSS-REFERENCE TO RELATED APPLICATION(S)

This application claims priority to German Patent Application No. 10 2020 103 648.5 filed on Feb. 12, 2020 the disclosure of which is incorporated herein by reference in its entirety.

BACKGROUND OF THE INVENTION

Field of the Invention

The present invention relates to impingement insert for re-using impingement air in an airfoil, an airfoil comprising an impingement insert, a turbomachine component and a gas turbine having the same, and more particularly to cooling of a turbomachine component or an airfoil comprising such an impingement insert.

Description of the Related Art

Turbomachines include various turbomachine components that benefit from cooling, resulting into increased operational life of the components. Cooling of turbo machine components allows an increase of the firing temperature, which allows an increase of the overall engine performance.

Certain turbomachine components have an airfoil, e.g. a blade or a vane. The airfoils enclose internal spaces and are cooled internally or from the inside by flowing cooling air through the internal space of the airfoil or through one or more cooling channels formed in the internal space of the airfoil.

The turbomachine component—hereinafter also referred to as the blade or vane—generally comprises of the airfoil (also referred to as an aerofoil) having an airfoil wall and an internal space defined by the airfoil wall. During operation of the gas turbine, the airfoil of the turbine section of the gas turbine are positioned in the hot gas path and are subjected to very high temperatures. Therefore, to provide cooling to the airfoil, one or more cooling channels are defined in the internal space of the airfoil. The entire internal space of the airfoil may form a cooling channel that generally extends in a longitudinal direction of the airfoil.

Alternatively, the airfoil may include at its inside one or more webs that extend from a pressure side to a suction side of the airfoil and thereby mechanically reinforce airfoil. The web, depending on the number of webs, divides the internal space of the airfoil into one or more cooling channels that extend along the longitudinal direction of the airfoil.

Cooling air generally flows along the longitudinal direction of the airfoil in such cooling channels after being introduced into the airfoil. Enhancement of such internal cooling of the airfoil would have beneficial effect on the efficiency of the gas turbine and/or on structural integrity of the airfoil.

It is commonly known to use impingement cooling of an inner surface of the airfoil, for example by using impingement inserts in the cooling channels. FIG. 10 shows a conventional impingement insert 80'. The wall of the impingement insert 80' defines a flow channel in which the cooling air 5 flows. The wall of the impingement insert 80' includes a plurality of impingement cooling holes 85 facing an internal surface of the airfoil wall 101. The cooling air from the flow channel is directed out of the impingement cooling holes 85, in form of impingement cooling jets 86, to impinge onto the internal surface of the airfoil wall 101. The impinged air then flows in the space between the impingement insert 80' and the airfoil wall 101. This creates cross-flows 5x for impingement jets 86 that are downstream in the flow direction of the impinged air flowing in the space between the impingement insert 80' and the airfoil wall 101. This reduces the cooling efficiency in such downstream parts or regions of the airfoil wall 101. Therefore, it is desirable to reduce such cross-flows.

Furthermore, for cooling of components of the gas turbine, a part of the air from the compressor section of the gas turbine is drawn and directed to different parts of the gas turbine to be used as cooling air. More cooling can be beneficial and can be achieved by drawing more air from the compressor. However, increase in an amount of air drawn from the compressor for cooling inadvertently results in decrease in the amount of air available for combustion—this may adversely affect the efficiency of the gas turbine. Therefore, it would be beneficial if cooling air that has been used once, e.g. for impingement cooling of a first surface, is reused for cooling another surface say a second surface, for example by being collected or extracted for being re-used, after having been used on the first surface, to form impingement jets that can impinge on the second surface.

Therefore, it is advantageous to enhance internal cooling of the airfoil.

SUMMARY OF THE INVENTION

The above objects are achieved by the subject matter of the independent claims, in particular by an insert for a turbomachine component for a gas turbine. Advantageous embodiments are provided in dependent claims.

Such turbomachine components that include an airfoil are exemplified hereinafter by a blade, however the description is also applicable to other turbomachine components that include an airfoil such as a vane, unless otherwise specified.

In a first aspect of the present technique, an impingement insert for a turbomachine component is presented.

The turbomachine component may be a component having an airfoil, e.g. a blade or vane of a turbine. One or more cooling channels may be formed in the airfoil of the turbomachine component. The impingement insert may be inserted or installed in such a cooling channel for providing impingement jets to an internal surface of the cooling channel i.e. the internal surface of the airfoil wall. Thus, the present technique also envisages the above described turbomachine component.

The impingement insert, hereinafter also referred to as the insert, includes a double-walled structure or section, having an outer wall and an inner wall.

The inner wall and the outer wall of the double-walled section may define three spatial divisions—an inner channel formed at an inner surface of the inner wall, an outer channel formed at an outer surface of the outer wall and a middle channel formed between the inner surface of the outer wall and the outer surface of the inner wall.

The inner channel may be bound by a wall at the opposite side of the impingement insert. In other words, if the double-walled section is present at a pressure side then the opposite side would be the suction side, and vice versa. The wall at the opposite side of the impingement insert may also have a double-walled section, similar to the aspects of the present technique. Alternatively, the wall at the opposite side of the impingement insert may just be a single wall.

The impingement insert includes a plurality of impingement cooling holes formed in the outer wall and configured to eject impingement jets into the outer channel. The impingement jets are formed of or are formed from the cooling air of the middle channel. In other words, the cooling air of the middle channel is ejected out as impingement jets through the impingement cooling holes into the outer channel.

The impingement insert may include at least one extraction duct. The extraction duct extends between the outer wall and the inner wall across the middle channel. Thus, the at least one extraction duct guides the air through the middle channel. Thus, the cooling air entering the impingement cooling holes from the middle channel is not mixed or is isolated from the air guided by the at least one extraction duct.

The extraction duct may have an inlet at the outer wall, preferably disposed at the outer surface of the outer wall, and may have an outlet at the inner wall of the insert, preferably disposed at the inner surface of the inner wall, so that cooling air can flow from the outer channel into the inner channel through the extraction duct. Thus, the extraction duct functions to extract cooling air from the outer channel into the inner channel.

Thus, according to the present technique, the cooling air provided into the airfoil enters the impingement insert, particularly the double-walled section of the impingement insert, flows into the middle channel and then is ejected out into the outer channel as impingement jets onto the inner surface of the airfoil to provide impingement cooling, then is extracted by the extraction duct from the outer channel into the inner channel.

The extracted cooling air may have been used once in the outer channel to cool the inner surface of the airfoil wall facing the outer channel, or adjacent to or facing the outer surface of the outer wall.

Preferably, this extracted cooling air may then be used for some further processes such as providing impingement cooling to another part or section of the inner surface of the airfoil wall.

According to the present technique, a size of the inlet and/or that of the outlet of the extraction duct may be larger than a size of the impingement cooling holes. Thus, providing easy flow of the cooling air through the extraction duct and therefore facilitating the extraction process.

The outer wall of the insert may have a corrugated shape.

The corrugated shape may comprise a plurality of recesses or troughs extending in a direction away from the inner wall, and one or more protrusions or ridges intervening the recesses or the troughs i.e. in an alternating way. One or more of the impingement cooling holes may be provided in at least one of the recesses or troughs. Preferably, all the recesses or troughs are provided with one or more of the impingement cooling holes.

The outlet of the extraction duct may be positioned at the one or more ridges or protrusions.

The double-walled section may include at least one main inlet for the cooling air. The at least one main inlet may be an inlet of the middle channel.

The double-walled section may be configured such that the cooling air received into the middle channel via the main inlet is ejected as impingement jets via the impingement cooling holes, and then is extracted from the outer channel into the inner channel via the extraction duct.

According to an exemplary embodiment, in a first sub-aspect of the first aspect, the main inlet may be disposed at a top side and/or bottom side of the middle channel. The top side and/or the bottom side may be understood as sides or regions of the middle channel that are spaced apart along a longitudinal direction of the impingement insert. The cooling air may enter the middle channel along the longitudinal direction.

According to another exemplary embodiment, in a second sub-aspect of the first aspect, the at least one main inlet may be disposed at a lateral side of the middle channel. The lateral side may be understood as extending parallel to a longitudinal direction of the impingement insert. The cooling air may enter the middle channel perpendicular to the longitudinal direction.

According to a further exemplary embodiment, the impingement insert may have a first section and a second section. The first section may be according to the first sub-aspect of the first aspect described hereinabove, and the second section may be according to the second sub-aspect of the first aspect described hereinabove.

A main outlet of the first section may be fluidly connected to the main inlet of the second section.

The main outlet of the first section may be an outlet of the inner channel.

The cooling air may flow across or pass over the external surfaces of the extraction duct, the extraction duct may thus be aerodynamically shaped with respect to the flow direction of the cooling air that enters the middle channel along the longitudinal direction or perpendicular to the longitudinal direction. The cross-section may have one of a round shape, an oval shape and an elliptical shape.

In a second aspect of the present technique, a turbomachine component for a gas turbine is provided.

The turbomachine component may include an airfoil having an airfoil wall defining an internal space of the airfoil. At least one cooling channel may be formed in the internal space of the airfoil. An impingement insert may be inserted in the cooling channel. The impingement insert may be according to the first aspect of the present technique described hereinabove. The outer channel may be defined between the outer surface of the outer wall and an inner surface of the airfoil wall.

In the turbomachine component, the double-walled section may include a main inlet formed at the middle channel and a main outlet formed at the inner channel.

The outer channel may be a closed chamber other than, i.e. besides, the impingement cooling holes of the outer wall and the inlet of the extraction duct, and optionally one or more film cooling holes that may be present in the airfoil wall. In other words, the outer channel may be a sealed space into which the cooling air may enter only by impingement cooling holes, i.e. no other air inlets into the outer channel are present, and from which the cooling air can flow out only via the inlet of the extraction duct or through one or more film cooling holes which may be present optionally, i.e. no other air outlets from the outer channel are present.

The middle channel may be a closed chamber other than, i.e. besides, the impingement cooling holes of the outer wall and the main inlet of the double-walled section. In other words, the middle channel may be a sealed space into which the cooling air may enter only via the main inlet of the double-walled section, i.e. no other air inlets into the middle channel are present, and from which the cooling air may leave only via the impingement cooling holes, i.e. no other air outlets from the middle channel are present.

The inner channel may be a closed chamber other than, i.e. besides, the outlet of the extraction duct and the main outlet of the double-walled section. In other words, the inner channel may be a sealed space into which the cooling air may enter only by the outlet of the extraction duct, i.e. no other air inlets into the inner channel are present, and from which the cooling air may leave only via the main outlet of the double-walled section, i.e. no other air outlets from the inner channel are present.

The inner surface of the airfoil wall may include extraction guides protruding from the inner surface of the airfoil wall towards the outer surface of the outer wall. The cooling air after having impinged onto the inner surface of the airfoil wall is guided by the extraction guides towards the inlet of the of the extraction duct.

According to a third aspect of the present technique, a gas turbine is presented. The gas turbine includes a turbomachine component according to the second aspect of the present technique.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

DESCRIPTION OF SPECIFIC EMBODIMENTS

Figure 1:
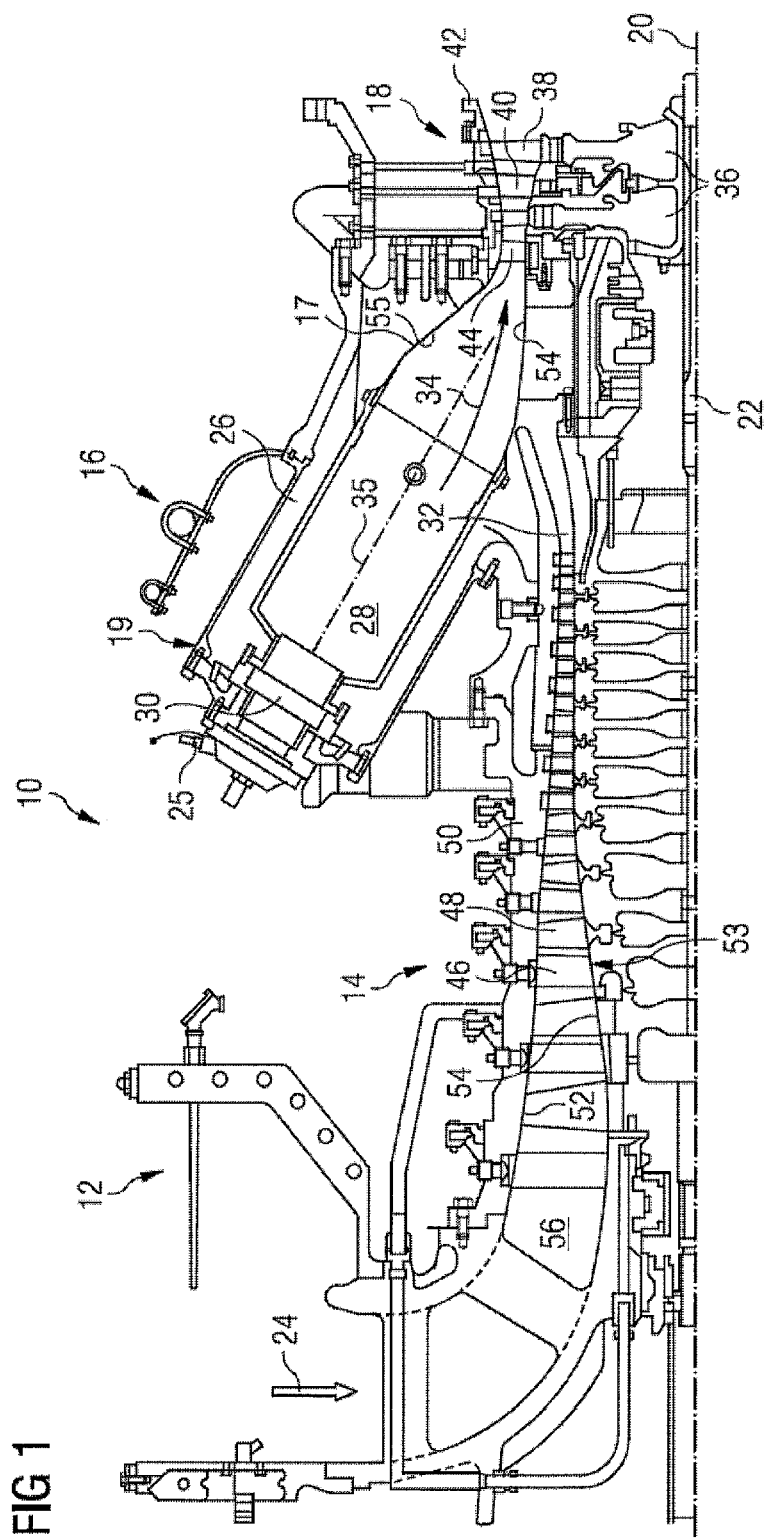
FIG. 1 shows part of an exemplary embodiment of a gas turbine in a sectional view and in which a turbomachine component of the present technique is incorporated.

Hereinafter, above-mentioned and other features of the present technique are described in detail. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

FIG. 1 shows an example of a gas turbine 10 in a sectional view. The gas turbine 10 may comprises, in flow series, an inlet 12, a compressor or compressor section 14, a combustor section 16 and a turbine section 18 which are generally arranged in flow series and generally about and in the direction of a longitudinal or rotational axis 20. The gas turbine 10 may further comprises a shaft 22 which is rotatable about the rotational axis 20 and which extends longitudinally through the gas turbine 10. The shaft 22 may drivingly connect the turbine section 18 to the compressor section 14.

In operation of the gas turbine 10, air 24, which is taken in through the air inlet 12 is compressed by the compressor section 14 and delivered to the combustion section or burner section 16. The burner section 16 may comprise a burner plenum 26, one or more combustion chambers 28 and at least one burner 30 fixed to each combustion chamber 28. The combustion chambers 28 and the burners 30 may be located inside the burner plenum 26. The compressed air passing through the compressor 14 may enter a diffuser 32 and may be discharged from the diffuser 32 into the burner plenum 26 from where a portion of the air may enter the burner 30 and is mixed with a gaseous or liquid fuel. The air/fuel mixture is then burned and the combustion gas 34 or working gas from the combustion is channeled through the combustion chamber 28 to the turbine section 18 via a transition duct 17.

This exemplary gas turbine 10 may have a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets may form an annulus for channeling the combustion gases to the turbine 18.

The turbine section 18 may comprise a number of blade carrying discs 36 attached to the shaft 22. In the present example, two discs 36 each carry an annular array of turbine blades 38 are depicted. However, the number of blade carrying discs could be different, i.e. only one disc or more than two discs. In addition, guiding vanes 40, which are fixed to a stator 42 of the gas turbine 10, may be disposed between the stages of annular arrays of turbine blades 38. Between the exit of the combustion chamber 28 and the leading turbine blades 38 inlet guiding vanes 44 may be provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimize the angle of the combustion or working gas on the turbine blades 38.

The turbine section 18 drives the compressor section 14. The compressor section 14 comprises an axial series of vane stages 46 and rotor blade stages 48. The rotor blade stages 48 may comprise a rotor disc supporting an annular array of blades. The compressor section 14 may also comprises a casing 50 that surrounds the rotor stages and supports the vane stages 48. The guide vane stages may include an annular array of radially extending vanes that are mounted to the casing 50. The vanes are provided to present gas flow at an optimal angle for the blades at a given gas turbine operational point. Some of the guide vane stages may have variable vanes, where the angle of the vanes, about their own longitudinal axis, can be adjusted for angle according to air flow characteristics that can occur at different gas turbine operations conditions. The casing 50 may define a radially outer surface 52 of the passage 56 of the compressor 14. A radially inner surface 54 of the passage 56 may be at least partly defined by a rotor drum 53 of the rotor which may be partly defined by the annular array of blades 48.

The present technique is described with reference to the above exemplary gas turbine having a single shaft or spool connecting a single, multi-stage compressor and a single, one or more stage turbine. However, it should be appreciated that the present technique is equally applicable to two or three shaft gas turbines and which can be used for industrial, aero or marine applications.

The terms upstream and downstream refer to the flow direction of the airflow and/or working gas flow through the gas turbine unless otherwise stated. The terms forward and rearward refer to the general flow of gas through the gas turbine, unless otherwise stated. The terms axial, radial and circumferential are made with reference to the rotational axis 20 of the gas turbine, unless otherwise stated.

Figure 2:
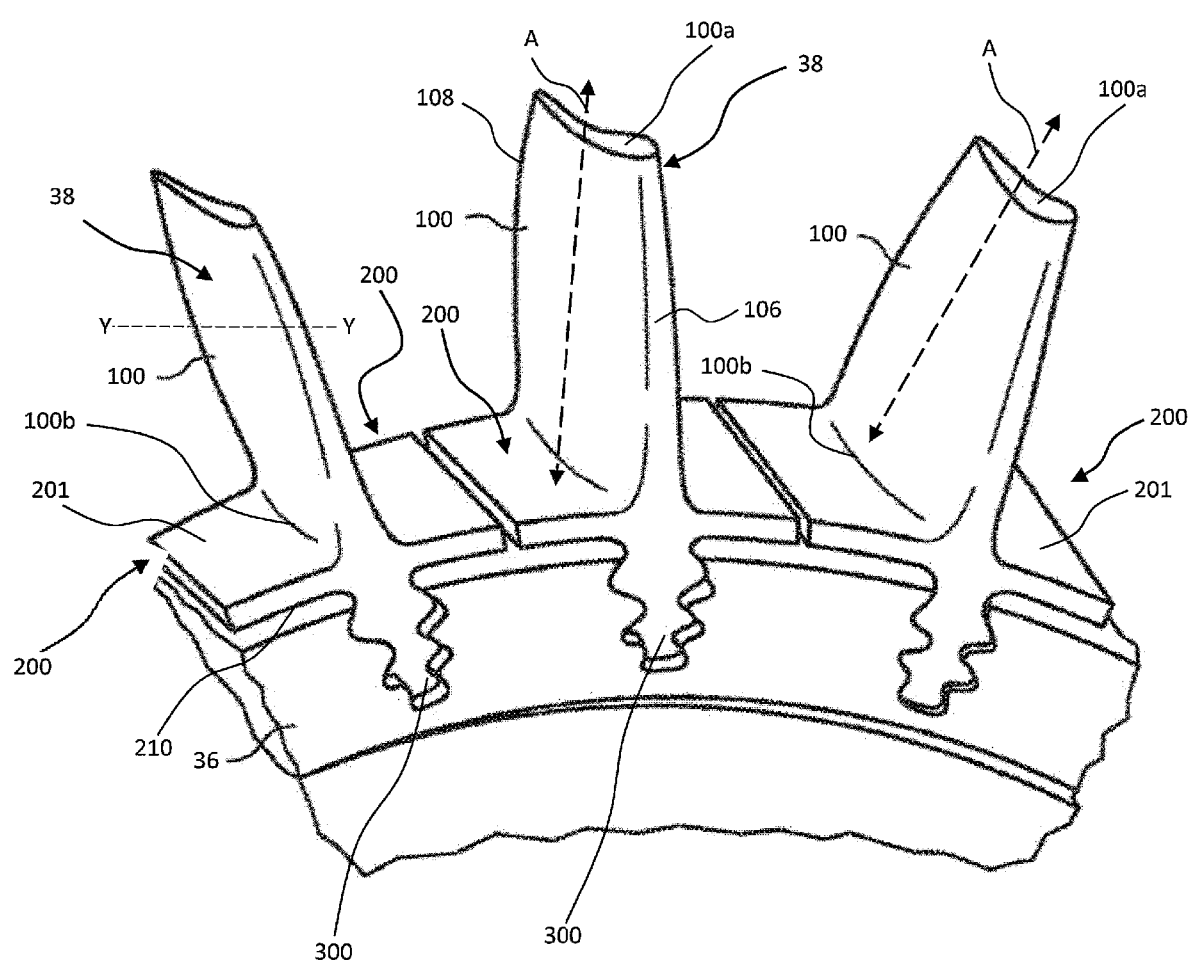
FIG. 2 is a perspective view illustrating an exemplary embodiment of a turbomachine assembly that includes an exemplary embodiment of a turbomachine component according to the present technique, exemplified by a blade in accordance with the present technique.
Figure 3:
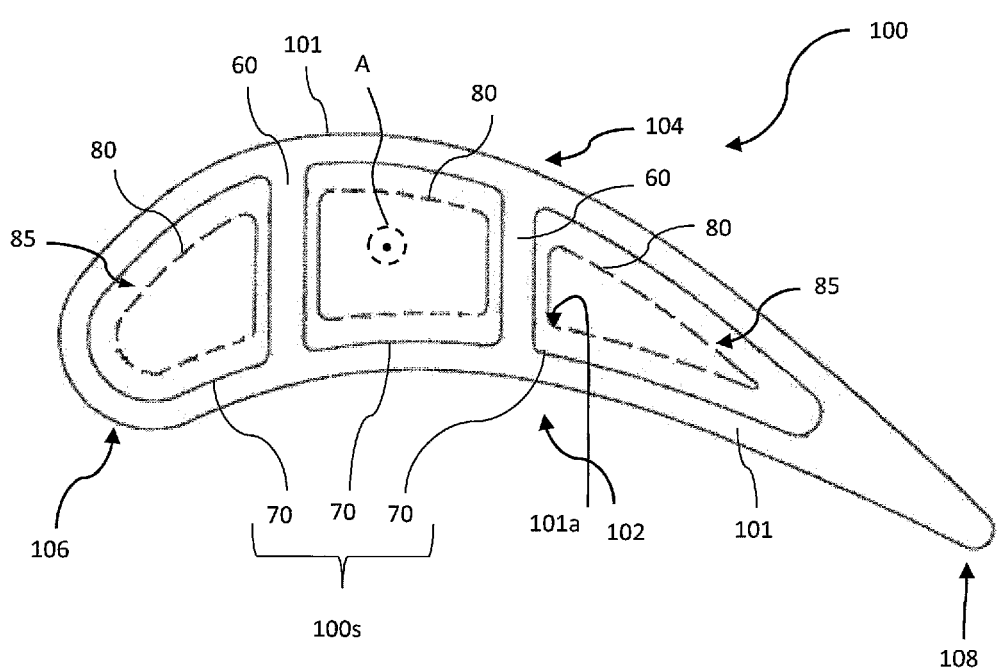
FIG. 3 is a cross-sectional view along the line Y-Y in FIG. 2 schematically depicting an exemplary location of an impingement insert of the present technique.

In the present technique, a turbomachine component including an airfoil 100 is presented—as shown for example in FIGS. 2 and 3. The turbomachine component of the present technique may be the blade 38 of the gas turbine 10, described hereinabove, unless other specified. The turbomachine component of the present technique may be the vane 40,44 of the gas turbine 10, described hereinabove, unless other specified. Hereinafter, for sake of simplicity and brevity and not intended to be a limitation unless otherwise specified, the turbomachine component has been exemplified, and has also been referred to, as a blade of the gas turbine, however it may be noted that the turbomachine component according to the present technique may also be another turbomachine component that includes an airfoil in accordance with the present technique. 1541 FIGS. 2 and 3 schematically depict an example of a turbomachine component, exemplified by the blade 38 of the gas turbine 10. FIG. 2 schematically depicts an example of a turbomachine assembly. The assembly may include the turbine blades 38, as the turbomachine component, arranged on the rotor disk 36. The turbine blade 38 may include a platform 200, an airfoil 100 and optionally a root 300. The blade 38 may be fixed to or mounted onto the disk 36 via the root 300.

In the turbomachine component, the airfoil 100 extends from the platform 200. The platform 200 may include an upper surface 201 and a lower surface 210. The airfoil 100 may extend from the upper surface 201 of the platform 200. The upper surface 201 may extend circumferentially. Similarly, the lower surface 210 may extend circumferentially. The airfoil 100 extends radially outwards from the upper surface 201 of the platform 200. The root 300 may extend radially downwards, opposite of the extension direction of the airfoil, from the lower surface 210 of the platform 200.

The airfoil 100 includes an airfoil wall 101 that encloses an internal space 100$s$ of the airfoil. The airfoil wall 101 may include a pressure side 102 (also referred to as pressure surface or concave surface/side) and a suction side 104 (also referred to as suction side or convex surface/side). The pressure side 102 and the suction side 104 meet each other at a leading edge 106 and a trailing edge 108 of the airfoil 100.

The airfoil 100 may have a base part 100$b$ adjoining the platform 200 and a tip part 100$a$ spaced apart from the base part 100$b$ along a longitudinal direction A of the airfoil 100.

The internal space 100$s$ of the airfoil 100 may form a cooling channel 70 bound by the airfoil wall 101.

Alternatively, at least one web 60 may be disposed within the internal space 100$s$ of the airfoil 100. The web 60 may extend between the pressure side 102 and the suction side 104. More precisely, each web 60 may extend between an inner surface 101$a$ of the airfoil wall 101 of the airfoil 100 at the pressure side 102 of the airfoil 100 and an inner surface 101$a$ of the airfoil wall 101 of the airfoil 100 at the suction side 104 of the airfoil 100. It may be noted that although the example of FIG. 3 shows two such webs 60, for exemplary purposes, the airfoil 100 may have 1 or 3 or more webs 60. Each of the webs 60 is connected to the pressure side 102 and the suction side 104. More precisely, each of the webs 60 may be connected to an inner surface 101$a$ of the airfoil wall 101 at the pressure side 102 and the inner surface 101$s$ of the airfoil wall 101 at the suction side 104.

The wall, i.e. the airfoil wall 101, of the airfoil 100 that includes the pressure side 102 and the suction side 104 and defines the leading edge 106 and the trailing edge 108 may also be referred to as the external wall of the airfoil 100 or as primary wall of the airfoil 100, besides being referred to as the airfoil wall 101. The airfoil wall 101 defines the external appearance of the airfoil 100, or in other words defines the airfoil shape.

Each of the web 60 may also be understood as formed by a wall in the airfoil 100, however the wall forming the web 60 is different than the airfoil wall 101 and may be referred to as internal wall or secondary wall of the airfoil 100.

As shown in the example of FIG. 3, the internal space 100$s$ of the airfoil 100 may include at least one cooling channel 70 for flow of cooling air 5. The cooling channels 70 may be understood as entire internal space 100$s$ or as sub-divisions of the internal space 100$s$ of the airfoil 100 created by the webs 60. It may be noted that although the example of FIG. 3 shows three such cooling channels 70, for exemplary purposes, the airfoil 100 may have 1 or 2 or 4 or more of such cooling channels 70.

The cooling air 5 may be provided into the cooling channel 70 from outside the airfoil 100, for example by cooling air flow paths (not shown) formed in the root 300 of the blade 1. Alternatively, or in addition to the above, the cooling air 5 may be provided into the cooling channel 70 from another, preferably adjacent, cooling channel 70 of the airfoil 100, wherein the cooling air is made to make a U-turn at the tip part 100$a$ or the base part 100$b$ of the airfoil thereby flowing out of a first cooling channel 70 and then flowing into a second cooling channel 70 from a top or bottom side, with respect to direction A, of the cooling channel.

The cooling channel 70 may extend along the longitudinal direction A of the airfoil 100, as shown in the example of FIGS. 2 and 3. As shown in the example of FIG. 3, each cooling channel 70 of the airfoil may be defined by one or more of the webs 60 and the pressure side 102 and the suction side 104. The example of FIG. 3 shows a first cooling channel 70 defined by one of the webs 60, a part of the pressure side 102, a part of the suction side 104 and the leading edge 106. The example of FIG. 3 also shows a second cooling channel 70 defined by one of the webs 60, a part of the pressure side 102, a part of the suction side 104 and the trailing edge 108. Furthermore, the example of FIG. 3 shows a third cooling channel 70 defined by two adjacent webs 60 facing each other, a part of the pressure side 102, and a part of the suction side 104. The third cooling channel may be understood as the cooling channel between the first and the second cooling channels, and may also be present in a plurality.

FIG. 3 also shows a schematic representation of one or more impingement inserts 80 according to the present technique inserted or positioned or formed in the cooling channel 70. The impingement insert 80 according to the present technique is explained hereinafter with reference to FIGS. 4 to 9. A conventional impingement insert 80' is shown in FIG. 10 for comparative understanding.

The impingement inserts 80 (hereinafter also referred to as the insert 80) may generally be understood as a component inserted in the cooling channel 70, or as a component formed, e.g. by additive manufacturing, in the cooling channel 70 and that includes one or more impingement holes 85 for ejecting impingement jets 86 of cooling air towards the inner surface 101a of the airfoil wall 101, preferably towards the pressure side 102 and/or the suction side 104 of the airfoil 100 and/or towards the leading edge 106 and/or towards the trailing edge 108 of the airfoil 100 for the purpose of impinging onto the inner surface 101a (hereinafter also referred to as the target surface) of the airfoil 100 to provide cooling of the target surface.

The impingement insert 80 may be inserted in the cooling channel 70 of the turbomachine component, which may be the blade 38 or the vane 40, 44, of the gas turbine 10 to provide impingement cooling to the inner surface 101a of the airfoil wall 101 that forms the cooling channel 70 in the airfoil 100 of the turbomachine component of the gas turbine 10.

Hereinafter, referring to FIGS. 5 and 6 in combination with FIG. 4, an exemplary embodiment of the impingement insert 80 of the present technique has been explained.

The impingement insert 80, hereinafter also referred to as the insert 80, includes a double-walled structure or section 1, 2. In FIG. 4 both section 1 and section 2 present exemplary embodiments of such a double-walled section.

Generally, the phrase 'double-walled' section or structure may be understood as a section having two walls, that are substantially parallelly disposed with respect to each other.

To explain further, when positioned within the airfoil 100, a side or part or region of the impingement insert 80 may be disposed adjacent to the pressure side 102 of the airfoil 100 as shown in FIG. 3, and may be referred to as a pressure side of the impingement insert 80. The pressure side of the impingement insert 80, may also be understood in other words, as a side of the impingement insert 80 for providing impingement jets 86 towards the pressure side 102 of the airfoil 100.

Similarly, when positioned within the airfoil 100, a side or part or region of the impingement insert 80, different than the pressure side of the impingement insert 80, may be disposed adjacent to the suction side 104 of the airfoil 100, as shown in FIG. 3, and may be referred to as of a suction side of the impingement insert 80. The suction side of the impingement insert 80, may also be understood in other words, as a side of the impingement insert 80 for providing impingement jets 86 towards the suction side 104 of the airfoil 100.

Figure 4:
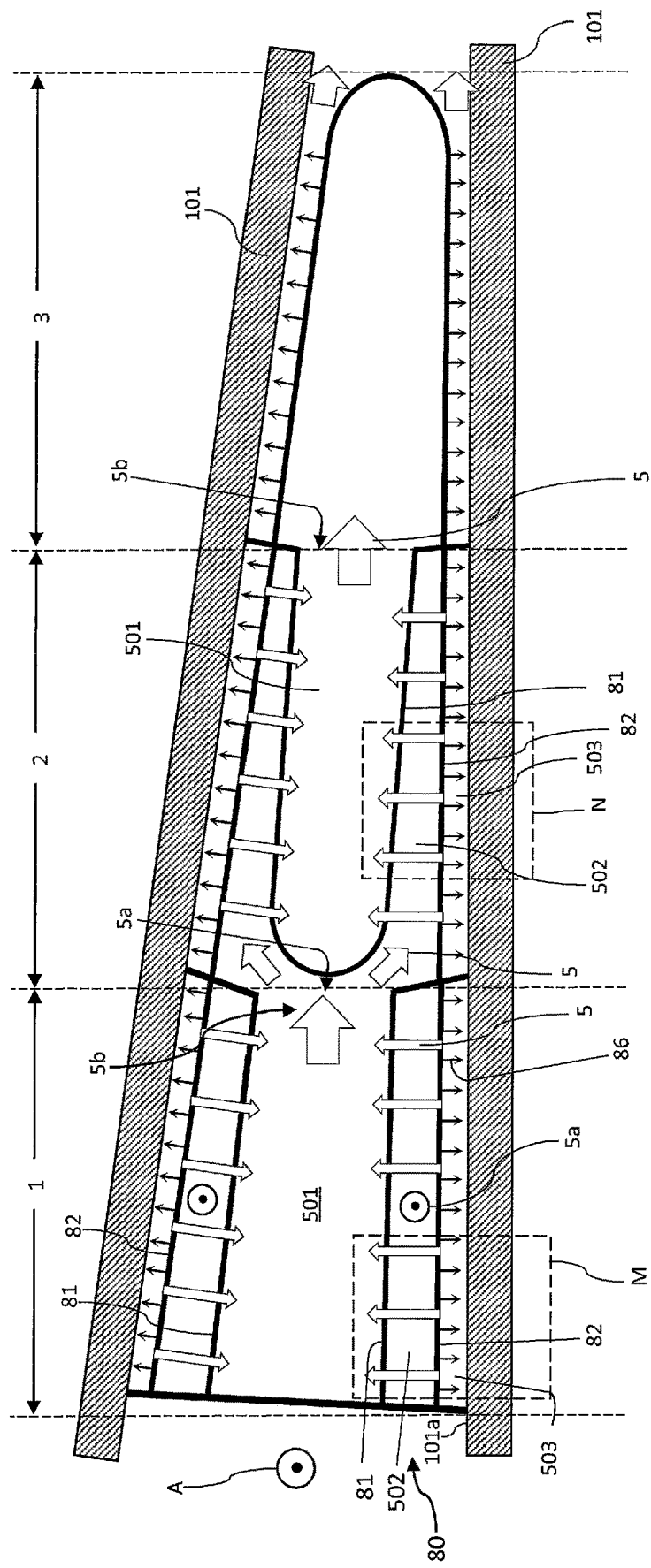
FIG. 4 schematically represents an exemplary embodiment of the impingement insert according to the present technique.

In the impingement insert 80, the term 'double-walled' includes that the suction side and/or the pressure side of the impingement insert 80, each has two walls, namely an outer wall 82 and an inner wall 81, as shown in FIG. 4. Simply put, only the suction side, or only the pressure side, or both the suction side and the pressure side, of the impingement insert 80 according to the present technique has two walls—the inner wall 81 and the outer wall 82. The 'double-walled' section, as used in the present technique, may not include a section, for example a section of the conventional impingement insert 80' shown in FIG. 10, that has only one wall at the suction side and the only one wall at the pressure side.

To explain further, the pressure side of the impingement insert 80 may comprises two walls—an inner wall 81 of the pressure side and an outer wall 82 of the pressure side—hence forming an example of the double-walled section. Alternatively, or in addition to the above, the suction side of the impingement insert 80 may comprises two walls—an inner wall 81 of the suction side and an outer wall 82 of the suction side—hence forming an example of the double-walled section. In short at least one of the pressure side and the suction side of the impingement insert comprises the double-walled section, and the other of the pressure side and the suction side of the impingement insert may comprise a single wall or may also comprise the double-walled section.

When both the pressure side and the suction side of the impingement insert comprise the double-walled section, then the two double-walled section may be symmetrical, with respect to a camber of the airfoil. When both the pressure side and the suction side of the impingement insert comprise the double-walled section, then the two double-walled section may be mirror image of each other, with respect to a camber of the airfoil.

In the double-walled section of the present technique, the outer wall 82 has been referred to as 'outer' because it forms an external appearance of the impingement insert 80. The inner wall 81 has been referred to as 'inner' since it is positioned inwards of the outer wall 82 with respect to a center (not shown) of the impingement insert 80 or with respect to center (not shown) or central axis (not shown) of the cooling channel 70 defined in the airfoil 100, as shown in FIG. 3.

Alternatively, the terms 'inner' and 'outer' may be understood as follows—the outer wall 82 of the impingement insert 80 is referred to as 'outer' since it is disposed towards the airfoil wall 101 i.e. near the pressure side 102 or the suction side 104 of the airfoil 100, when the impingement insert 80 is located within the airfoil 100. The outer wall 82 is located between the inner surface 101a of the airfoil wall 101 and the inner wall 81 of the double-walled section.

Simply put, when moving from an outside of the impingement insert 80 into the impingement insert 80 from a lateral side of the impingement insert 80, first appears the outer wall 82 of the impingement insert 80 and then the inner wall 81 of the impingement insert 80. Similarly, when the impingement insert 80 is located in the airfoil 100, when moving from an outside of the airfoil 100 into the airfoil 100 from a lateral side (e.g. the pressure side or suction side of the airfoil) of the airfoil 100, first appears the airfoil wall 101, then the outer wall 82 of the impingement insert 80 and then the inner wall 81 of the impingement insert 80.

Figure 5:
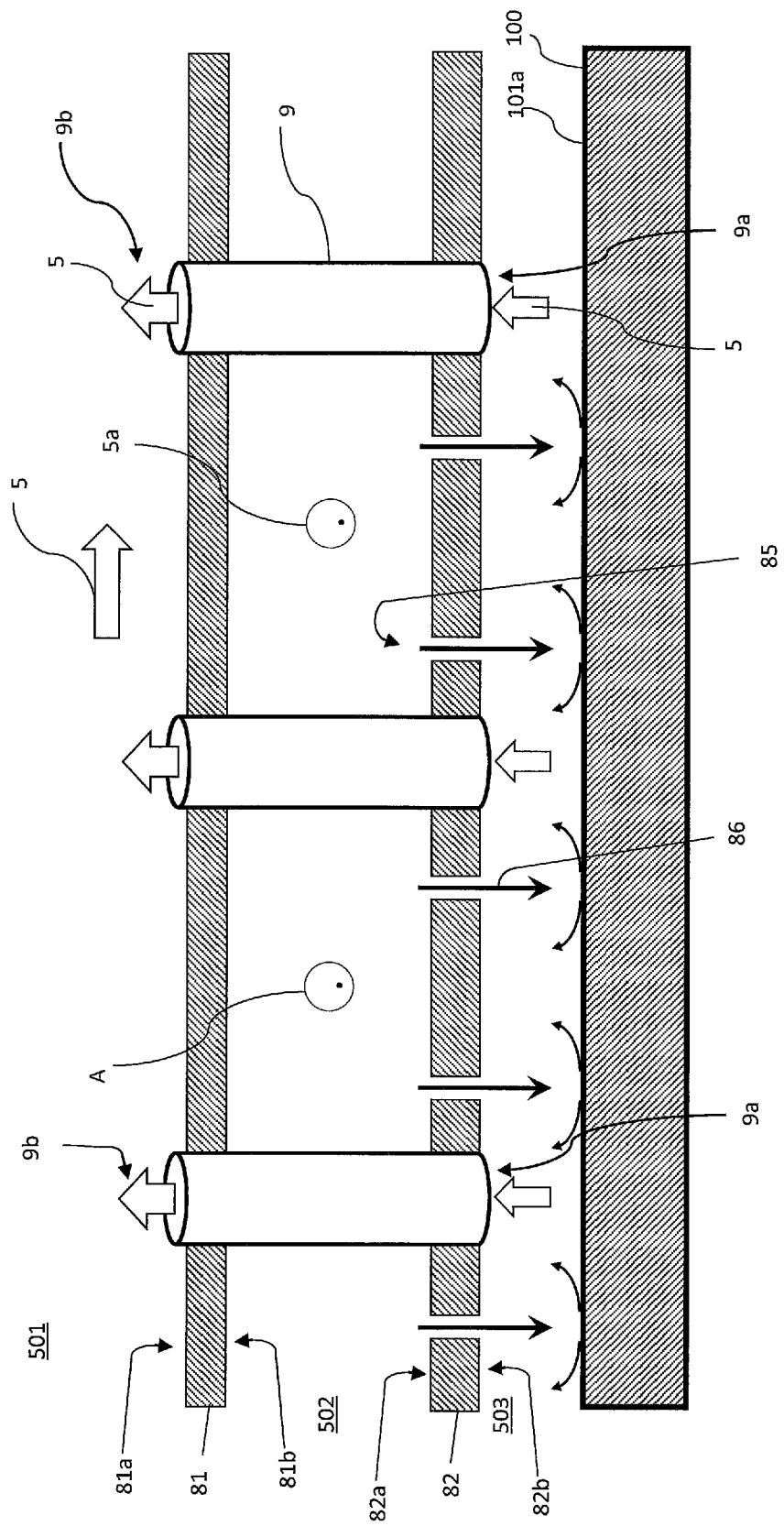
FIG. 5 schematically represents a part M, shown in FIG. 4, of the impingement insert of FIG. 4.
Figure 6:
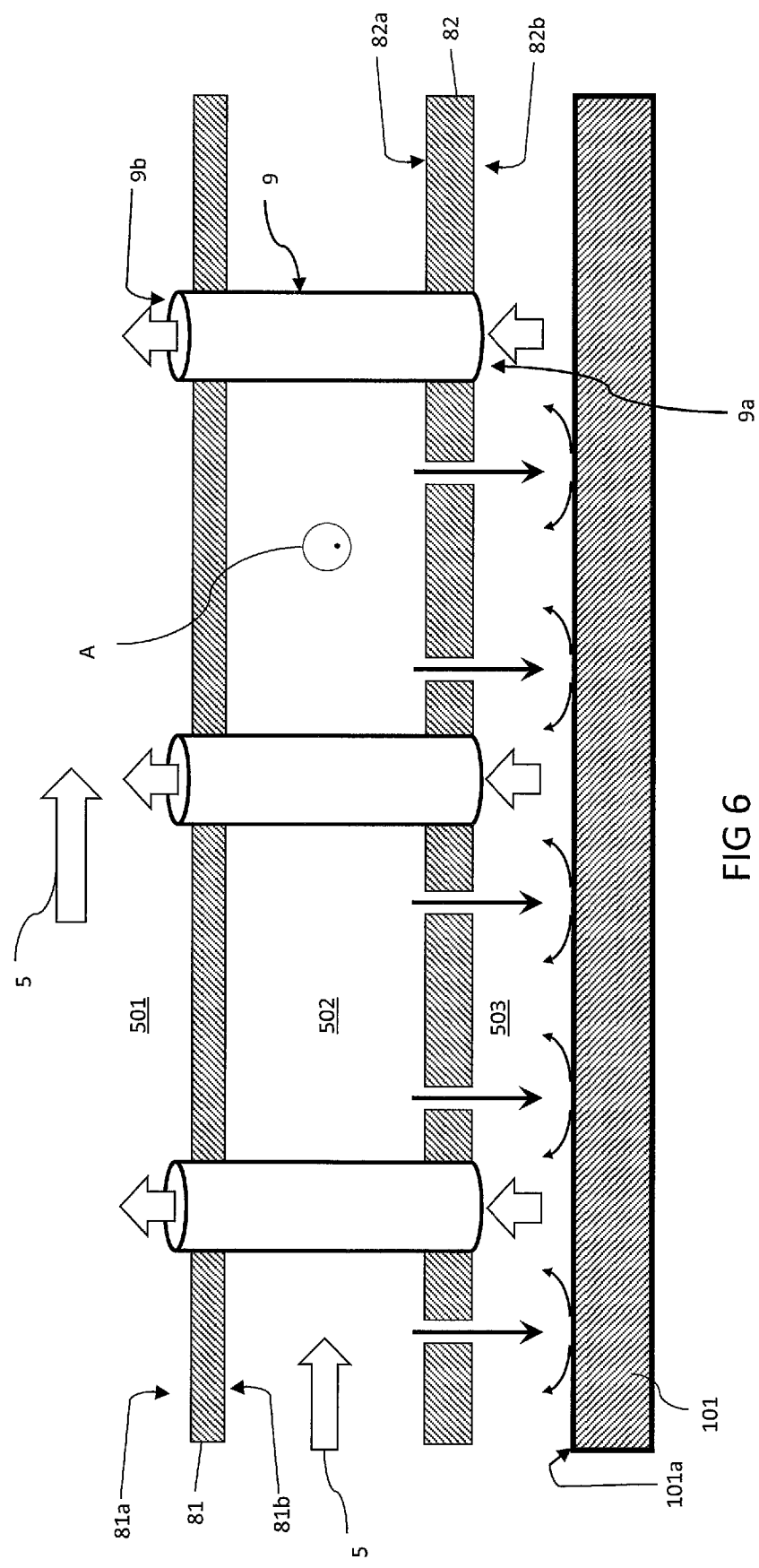
FIG. 6 schematically represents another part N, shown in FIG. 4, of the impingement insert of FIG. 4.

As shown in FIGS. 4 to 6, the inner wall 81 has an inner surface 81a and an outer surface 81b, and the outer wall 82 has an inner surface 82a and an outer surface 82b. The inner surface 82a of the outer wall 82 faces the outer surface 81b of the inner wall 81. The space between the inner and the outer walls 81, 82 is referred to as middle channel 502. The middle channel 502 is defined or present between the inner surface 82a of the outer wall 82 and the outer surface 81b of the inner wall 81.

The outer surface 82b of the outer wall 82 is configured to face the inner surface 101a of the airfoil wall 100, when the impingement insert 80 is positioned within the airfoil 100.

As shown in FIGS. 4 to 6, in the impingement insert 80, the inner wall 81 and the outer wall 82 of the double-walled section define three spatial divisions—an inner channel 501 formed at the inner surface 81a of the inner wall 81, an outer channel 503 formed at the outer surface 82b of the outer wall 82 and the middle channel 502 formed between the inner surface 82a of the outer wall 82 and the outer surface 81b of the inner wall 81.

Simply put, the middle channel 502 is defined between the outer and the inner walls 81, 82, the inner channel 501 is at the inner wall side of the middle channel 502 and the outer channel 503 is at the outer wall side of the middle channel 502. The middle channel 502 may be disposed between the inner and the outer channels 501, 502.

As shown in FIGS. 4 to 6, when the impingement insert 80 is positioned within the airfoil 100, the space between the airfoil wall 101 and the outer wall 82 may be referred to as the outer channel 503. More precisely, the space between the airfoil wall 101 and the outer surface 82b of the outer wall 82 may be referred to as the outer channel 503. Even more particularly, the space between the inner surface 101a of the airfoil wall 101 and the outer surface 82b of the outer wall 82 may be referred to as the outer channel 503.

To explain further, as shown in FIGS. 4 to 6, when moving from a center (not shown) of the impingement insert 80 towards an outside of the impingement insert 80, first appears the inner channel 501, then the inner surface 81a of the inner wall 81 of the double-walled section, then the outer surface 81b of the inner wall 81 of the double-walled section, then the middle channel 502, then the inner surface 82a of the outer wall 82 of the double-walled section, then the outer surface 82b of the outer wall 82 of the double-walled section. On continuing further, finally the inner surface 101a of the airfoil wall 100 would appear, if the impingement insert 80 were positioned or located within the airfoil 100.

As shown in FIGS. 4 to 6, the impingement insert 80 includes a plurality of impingement cooling holes 85 formed as through-holes in the outer wall 82 and configured to eject impingement jets 86 into the outer channel 503. The impingement jets 86 are formed of or formed from the cooling air 5 of the middle channel 502. In other words, the cooling air 5 of the middle channel 502 is ejected out as impingement jets 86 through the impingement cooling holes 85 into the outer channel 503. The cooling air 5 is ejected out via the impingement cooling holes 85 in form of impingement jets 86 towards the inner surface 101a of the airfoil wall 100, if the impingement insert 80 were positioned or located within the airfoil 100.

As shown in FIGS. 4 to 6, the impingement insert 80 includes at least one extraction duct 9. The extraction duct 9 may be understood as a pipe or tube that extends between the outer wall 82 and the inner wall 81 across the middle channel 502, i.e. from the outer wall 82 to the inner wall 81 across the middle channel 502. A cross-section of the extraction duct 9 may be circular, or oval, or polygonal. The cross-section of the extraction duct 9 may be aerodynamically shaped which may be oriented accordingly to any flow of cooling air 5 that occurs across or past the extraction duct 9, explained later with reference to FIG. 9.

As shown in FIGS. 5 and 6, the extraction duct 9 has an inlet 9a that may be disposed at the outer surface 82b of the outer wall 82. The extraction duct 9 has an outlet 9b that may be disposed at the inner surface 81a of the inner wall 81. In other words, the extraction duct 9 fluidly connects the outer channel 503 and the inner channel 501, so that cooling air 5 can flow from the outer channel 503 into the inner channel 501 through the extraction duct 9. The cooling air 5 passes from the outer channel 503 to the inner channel 501 by flowing in a confined way, confined in the extraction duct 9, through the intervening middle channel 502.

Thus, the extraction duct 9 functions to extract cooling air 5 from the outer channel 503 into the inner channel 501.

It may be noted, that in the present technique the terms 'inlet' and 'outlet' and like terms, have been used with reference to cooling air. In other words, an 'inlet' may mean 'inlet for cooling air' and similarly, an 'outlet' may mean 'outlet for cooling air', unless otherwise stated.

The inlet 9a of the extraction duct 9 may be flush with the outer surface 82b of the outer wall 82.

Similarly, the outlet 9b of the extraction duct 9 may be flush with the inner surface 81a of the inner wall 81.

Thus, as shown in FIGS. 4 to 6, in the present technique, the double-walled section 1, 2 structurally implements a flow scheme by which the cooling air 5 from the middle channel 502 is ejected as impingement jets 86 via the impingement cooling holes 85 into the outer channel 503 for impinging onto the inner surface 101a of the airfoil wall 100, and then is extracted from the outer channel 503 into the inner channel 501 via the extraction duct 9.

As shown in FIG. 4, the double-walled section 1, 2 may include a main inlet 5a for the cooling air 5. The main inlet 5a may be an inlet of the middle channel 502. The main inlet 5a may be the only inlet of the double-walled section 1, 2.

The cooling air 5 that circulates through the double-walled section 1, 2 may enter the double-walled section 1, 2 via the main inlet 5a. In other words, the cooling air 5 that circulates through the double-walled section 1, 2 may enter the middle channel 502 first via the main inlet 5a and then flows to the outer channel 503 via impingement cooling holes 85, and thereafter flows to the inner channel 501 via the extraction duct 9.

Referring now to part M, shown in FIG. 5, and part N, shown in FIG. 6, two alternative embodiments, say a first embodiment and a second embodiment, of the impingement insert 80 of the present technique are hereinafter described.

As shown in section 1 of FIG. 4 and also in FIG. 5, according to one exemplary embodiment, i.e. the first embodiment, the main inlet 5a may be disposed at a top side or at bottom side of the middle channel 502. It may be possible to have a main inlet on both the bottom and top of the middle channel 502. The top side and the bottom side may be understood as sides or regions of the middle channel 502 that are spaced apart along the longitudinal direction A (also shown in FIGS. 2 and 3) of the impingement insert 80. The top side and the bottom side of the middle channel 502 may correspond to or coincide with the tip part 100a and the base part 100b of the airfoil 100 shown in FIG. 2.

The top side and the bottom side of the impingement insert 80 may be spaced apart along the longitudinal direction A which may be understood to be same as a longitudinal direction of the impingement insert 80. The cooling air 5 may enter the middle channel 502 along the longitudinal direction A.

The longitudinal direction A may also be understood as the radial direction with respect to the rotational axis of the gas turbine.

Alternatively, as shown in section 2 of FIG. 4 and also in FIG. 6, according to another exemplary embodiment, i.e. the second embodiment, the main inlet 5a may be disposed at a lateral side of the middle channel 502. The lateral side may be understood as extending parallel to the longitudinal direction A of the impingement insert 80. The cooling air 5 may enter the middle channel 502 perpendicular to the longitudinal direction A.

In accordance with aspects of the present technique, although not depicted, the entire structure of the impingement insert 80 may be as described for the first embodiment e.g. as shown in section 1 of FIG. 4 and also in FIG. 5. Alternatively, in accordance with aspects of the present technique, although not depicted, the entire structure of the impingement insert 80 may be as described for the second embodiments e.g. as shown in section 2 of FIG. 4 and also in FIG. 6. Furthermore, in accordance with aspects of the present technique, as shown in FIG. 4, the entire structure of the impingement insert 80 may have multiple sections—one of which, say a first section 1, may be as described hereinabove for the first embodiment and as shown in section 1 of FIG. 4, while another of which, say a second section 2, may be as described hereinabove for the second embodiment and as shown in section 2 of FIG. 4.

In short, in an exemplary embodiment, the impingement insert 80 may have a first section 1 and a second section 2 as shown in FIG. 4, as part of the same impingement insert 80.

As shown further in FIG. 4, at the dotted line between the sections marked as '1' and '2', a main outlet 5b of the first section 1 may be fluidly connected to the main inlet 5a of the second section 2. More particularly, the main outlet 5b of the first section 1 may be an outlet of the inner channel 501 of the first section 1. Thus, as shown in FIG. 4, the cooling air 5 may first enter the first section 1 then flow out of the first section 1 into the second section 2.

More particularly, as shown in FIG. 4, the cooling air 5 may first enter the middle channel 502 of the first section 1 via the main inlet 5a, then is ejected as impingement jets 86 via the impingement cooling holes 85 of the outer wall 82 of the first section 1 into the outer channel 503 of the first section 1 for impinging onto the inner surface 101a of the airfoil wall 100 adjacent to the first section 1, and then is extracted from the outer channel 503 of the first section 1 into the inner channel 501 of the first section 1 via the extraction duct 9 of the first section 1. Thereafter, the extracted cooling air 5 flows out of the main outlet 5b of the first section 1, which may simply be the outlet of the middle channel 502 of the first section 1.

The outflowing extracted cooling air 5 then enters the second section 2 via the main inlet 5a of the second section 2. The cooling air 5 may enter the middle channel 502 of the second section 2 via the main inlet 5a, then is ejected as impingement jets 86 via the impingement cooling holes 85 of the outer wall 82 of the second section 2 into the outer channel 503 of the second section 2 for impinging onto the inner surface 101a of the airfoil wall 100 adjacent to the second section 2, and then is extracted from the outer channel 503 of the second section 2 into the inner channel 501 of the second section 2 via the extraction duct 9 of the second section 2. Thereafter, the extracted cooling air 5 may flow out of the main outlet 5b of the second section 2, which may simply be the outlet of the middle channel 502 of the second section 2.

As shown in FIG. 4, the impingement insert 80 may also have a third section 3, which may not be a double-walled section, however one or more walls of the third section 3 may have impingement cooling holes 85 formed therein, and may form impingement jets 86 ejected out towards the inner surface 101a of the airfoil wall 101 positioned adjacent to the third section 3. The impingement jets 86 comprise the cooling air 5 that flowed out of the main outlet 5b of the second section 2 and into the third section 3.

Further aspects of the present technique have been discussed hereinafter with respect to FIGS. 7 and 8.

Figure 7:
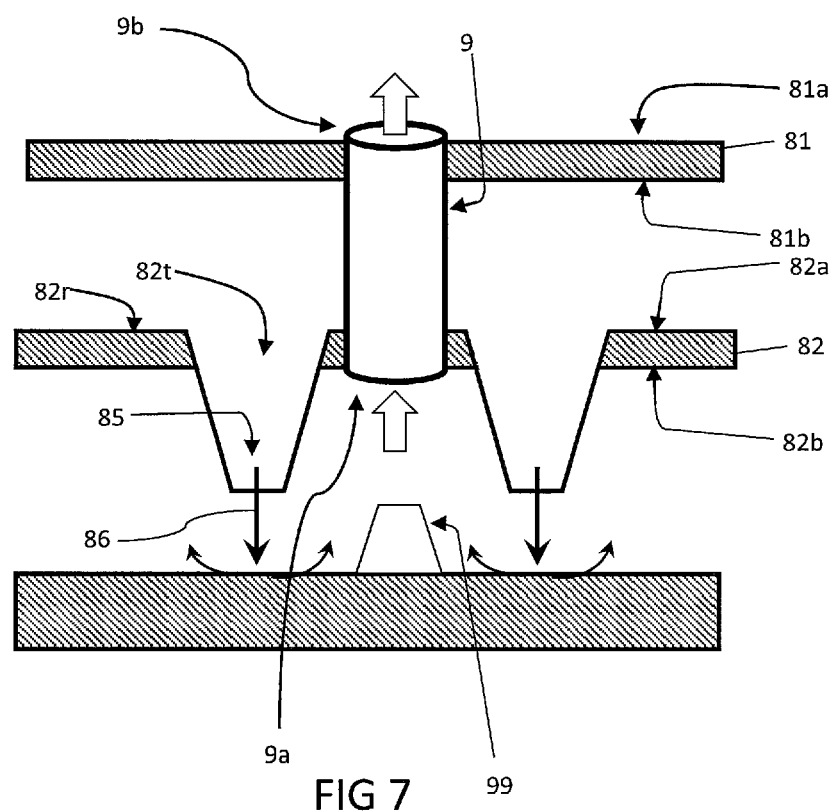
FIG. 7 schematically represents a section of another exemplary embodiment of the impingement insert of the present technique.
Figure 8:
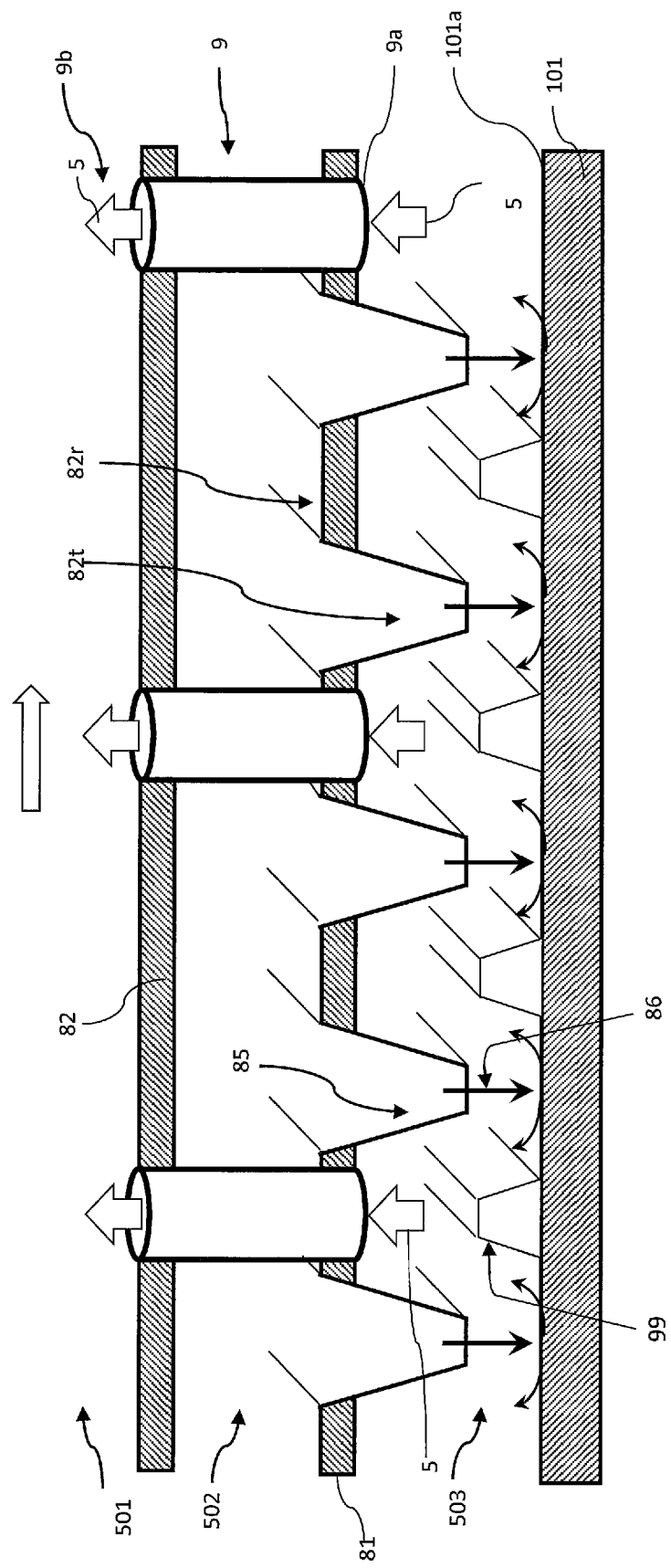
FIG. 8 schematically represents a larger section of the exemplary embodiment of the impingement insert of the present technique including the section of FIG. 7.

As shown in FIGS. 7 and 8, the outer wall 82 may have a corrugated shape. This may be the wall in any of the sections 1 and 2 of FIG. 4. The corrugated shape includes a plurality of troughs 82t or indented regions 82t that extend in a direction away from the inner wall 81. One or more ridges 82r or protruded regions 82r may intervene the troughs 82t i.e. in an alternating way. One or more of the impingement cooling holes 85 may be placed or formed or located or disposed or provided in at least one of the troughs 82t. Preferably all the troughs 82t are provided with one or more of the impingement cooling holes 85.

As shown in FIGS. 7 and 8, the outlet 9b of the extraction duct 9 may be positioned at the one or more ridges 82r.

Furthermore, as shown in FIGS. 7 and 8, when the impingement insert 80 is positioned in the airfoil 100, the inner surface 101a of the airfoil wall 101 may include extraction guides 99 protruding from the inner surface 101a of the airfoil wall 101 towards the outer surface 82b of the outer wall 82. The extraction guides 99 may be configured, for example shaped and/or sized, e.g. by having inclined surfaces, to guide the cooling air 5 from the outer channel 503 towards the inlet 9a of the of the extraction duct 9 or into the inlet 9a of the of the extraction duct 9.

Further aspects of the present technique have been discussed hereinafter with respect to FIG. 9.

According to the present technique, a size of the inlet 9a and/or the outlet 9b of the extraction duct 9 may be larger than a size of the impingement cooling holes 85. Here, 'size' may be understood as cross-sectional area. Thus, providing easy flow of the cooling air through the extraction duct 9 and therefore facilitating the extraction process.

Figure 9:
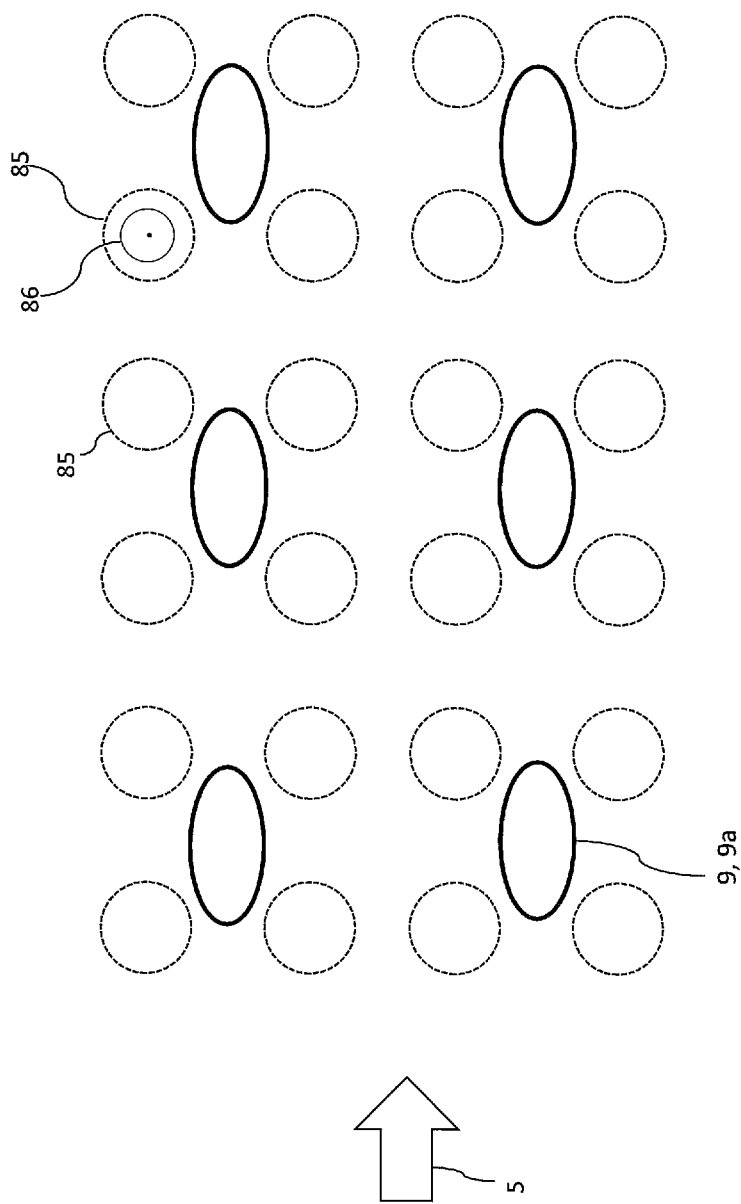
FIG. 9 schematically represents a relative size and/or orientation and/or distribution of the impingement holes and an inlet of the extraction duct of the present technique.
Figure 10:
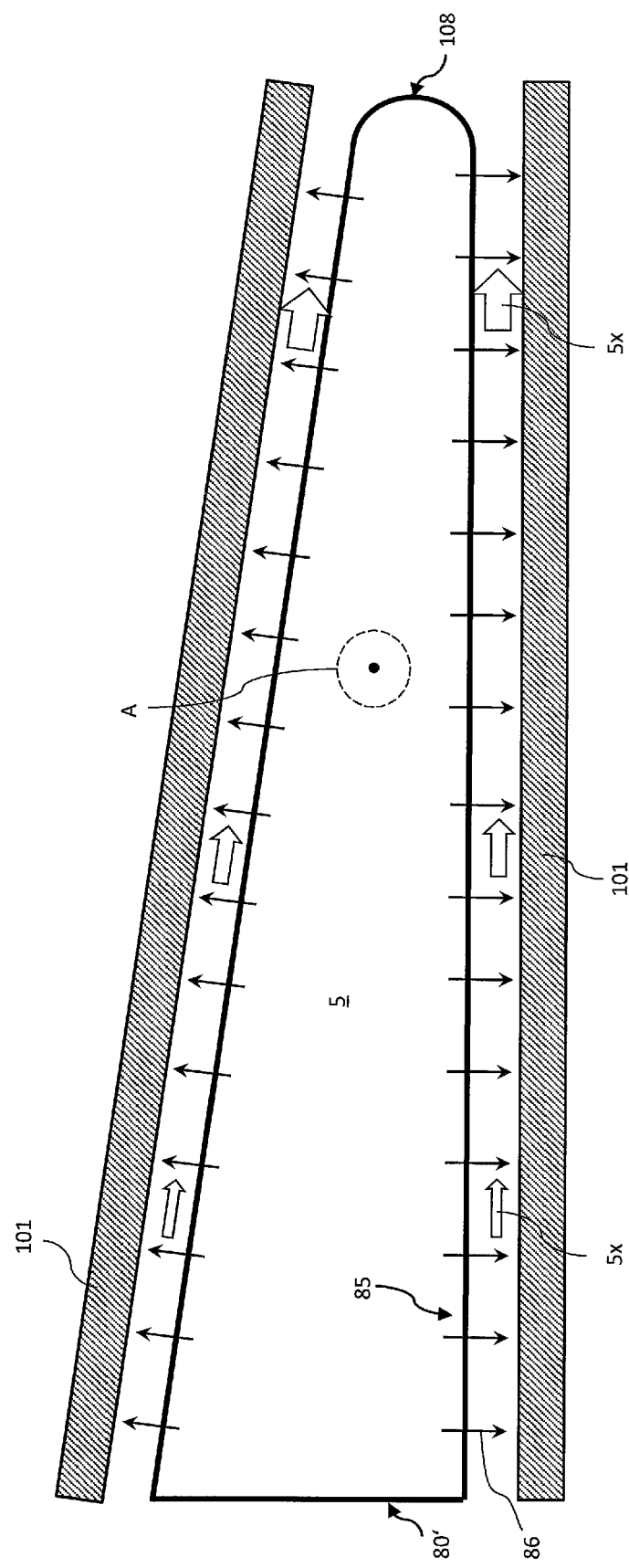
FIG. 10 illustrates a conventional impingement insert, for comparative understanding of the impingement insert of the present technique.

Furthermore, as shown in FIG. 9, since in the present technique the cooling air 5 flows into the middle channel 502 and since the extraction ducts 9 are located across the middle channel 502, the cooling air 5 flows across or past the external surfaces of the extraction duct 9. Thus, the extraction duct 9 may be aerodynamically shaped with respect to a direction of the cooling air 5 on entry into the middle channel 502 and/or while flowing through the middle channel 502—whether along the longitudinal direction A (i.e. flow direction coincides with the direction A) as shown in FIG. 5 or in the section 1 of FIG. 4, or perpendicular to the longitudinal direction A (i.e. flow direction is lateral or normal to the direction A) as shown in FIG. 6 or in the section 2 of FIG. 4.

As shown in FIG. 9, the cross-section of the extraction duct 9 may be oval or elliptical in shape. Preferably, having the long axis or the longer axis of the shape aligned with or parallel to the flow direction of the cooling air while flowing through the middle channel 502.

Furthermore, as shown in FIG. 9, there may be multiple extraction ducts 9, and the extraction ducts 9 may be distributed, preferably evenly, with respect to a distribution of the impingement cooling holes 85 on the outer wall 82. In other words, the inlets 9a of the extraction ducts 9 may be distributed at the outer surface 82b of the outer wall 82, preferably, evenly amongst the impingement cooling holes 85 of the outer wall 82. As shown in example of FIG. 9, each inlets 9a of the extraction ducts 9 may be surrounded by plurality of impingement cooling holes 85, for example 4 impingement cooling holes 85 are depicted in FIG. 9.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope of the appended claims. The scope of the invention is, therefore, indicated by the following claims rather than by the foregoing description. All changes, modifications, and variations coming within the meaning and range of equivalency of the claims are to be considered within their scope.

What is claimed is:

1. An impingement insert for a turbomachine component, the impingement insert comprising:
   a double-walled section having an inner wall and an outer wall defining an inner channel formed at an inner surface of the inner wall, an outer channel formed at an outer surface of the outer wall and a middle channel formed between an inner surface of the outer wall and an outer surface of the inner wall;
   a plurality of impingement cooling holes formed in the outer wall and configured to eject impingement jets into the outer channel, the impingement jets being formed of cooling air of the middle channel; and
   at least one extraction duct extending between the outer wall and the inner wall across the middle channel, and comprising an inlet disposed at the outer surface of the outer wall and an outlet disposed at the inner surface of the inner wall to extract cooling air from the outer channel into the inner channel,
   wherein a plurality of extraction ducts are evenly distributed with respect to a distribution of the impingement cooling holes on the outer wall, and inlets of the extraction ducts are evenly distributed at the outer surface of the outer wall between the impingement cooling holes in the outer wall.

2. The impingement insert according to claim 1, wherein a size of the inlet and/or the outlet of the extraction duct is larger than a size of the impingement cooling holes.

3. The impingement insert according to claim 1, wherein the outer wall has a corrugated shape comprising a plurality of recesses extending in a direction away from the inner wall, and one or more protrusions intervening the recesses, wherein one or more of the impingement cooling holes are provided in at least one of the troughs.

4. The impingement insert according to claim 3, wherein the inlet of the extraction duct is positioned at one of the one or more ridges.

5. The impingement insert according to claim 1, wherein the double-walled section comprises a main outlet for the cooling air, and wherein the main outlet is an outlet of the inner channel.

6. The impingement insert according to claim 1, wherein the double-walled section comprises at least one main inlet for the cooling air, and wherein the at least one main inlet is an inlet of the middle channel.

7. The impingement insert according to claim 6, wherein the double-walled section is configured such that the cooling air received into the middle channel via the at least one main inlet is ejected as impingement jets via the impingement cooling holes, and then is extracted from the outer channel into the inner channel via the extraction duct.

8. The impingement insert according to claim 6, wherein the main inlet is disposed at a top side and/or a bottom side of the middle channel, the top side and the bottom side being spaced apart along a longitudinal direction of the impingement insert, such that the cooling air flows through the middle channel along the longitudinal direction.

9. The impingement insert according to claim 6, wherein the main inlet is disposed at a lateral side of the middle channel, the lateral side extending parallel to a longitudinal direction of the impingement insert, such that the cooling air flows through the middle channel perpendicular to the longitudinal direction.

10. The impingement insert according to claim 1, wherein the extraction duct is aerodynamically shaped with respect to a flow of the cooling air flowing through the middle channel; and/or a cross-section of the extraction duct has one of a round shape, an oval shape and/or an elliptical shape.

11. The impingement insert according to claim 6, wherein the double walled section comprises a first double-walled section and a second double-walled section,
   wherein the first double-walled section has a main inlet at a top side and/or a bottom side of the middle channel and the second double-walled section has a main inlet at the lateral side of the middle channel.

12. The impingement insert according to claim 11, wherein the first double-walled section is fluidly connected to the second double-walled section.

13. A turbomachine component for a gas turbine, the turbomachine component comprising:
   an airfoil having an airfoil wall defining an internal space of the airfoil;
   at least one cooling channel formed in the internal space of the airfoil; and
   an impingement insert inserted in the cooling channel, wherein the impingement insert comprising:
   a double-walled section having an inner wall and an outer wall defining an inner channel formed at an inner surface of the inner wall, an outer channel formed between an outer surface of the outer wall and an inner surface of the airfoil wall and a middle channel formed between an inner surface of the outer wall and an outer surface of the inner wall;
   a plurality of impingement cooling holes formed in the outer wall and configured to eject impingement jets into the outer channel, the impingement jets being formed of cooling air of the middle channel; and
   at least one extraction duct extending between the outer wall and the inner wall across the middle channel, and comprising an inlet disposed at the outer surface of the outer wall and an outlet disposed at the inner surface of the inner wall to extract cooling air from the outer channel into the inner channel,
   wherein a plurality of extraction ducts are evenly distributed with respect to a distribution of the impingement cooling holes on the outer wall, nd inlets of the ex ducts are evenly distributed at the outer surface of the outer wall between the impingement cooling holes in the outer wall.

14. The turbomachine component according to claim 13, wherein the inner surface of the airfoil wall comprises extraction guides protruding from the inner surface of the airfoil wall towards the outer surface of the outer wall and configured to guide the cooling air after having impinged onto the inner surface of the airfoil wall towards the inlet of the of the extraction duct.

15. The turbomachine component according to claim 13, wherein a size of the inlet and/or the outlet of the extraction duct is larger than a size of the impingement cooling holes.

16. The turbomachine component according to claim 13, wherein the outer wall has a corrugated shape comprising a plurality of recesses extending in a direction away from the inner wall, and one or more protrusions intervening the recesses, wherein one or more of the impingement cooling holes are provided in at least one of the troughs.

17. The turbomachine component according to claim 13, wherein the inlet of the extraction duct is positioned at one of the one or more ridges.

18. The turbomachine component according to claim 13, wherein the double-walled section comprises a main outlet for the cooling air, and wherein the main outlet is an outlet of the inner channel.

19. The turbomachine component according to claim 13, wherein the double-walled section is configured such that the cooling air received into the middle channel via the at least one main inlet is ejected as impingement jets via the impingement cooling holes, and then is extracted from the outer channel into the inner channel via the extraction duct.

20. A gas turbine comprising a turbomachine component, wherein the turbomachine component is according to claim 13.

* * * * *